(12) United States Patent
Virdi et al.

(10) Patent No.: US 12,092,240 B2
(45) Date of Patent: Sep. 17, 2024

(54) YSZ CERAMIC SUBSTRATE PROTECTED FIREPROOF HOSE

(71) Applicant: EATON INTELLIGENT POWER LIMITED, Dublin (IE)

(72) Inventors: Preetinder Singh Virdi, Punjab (IN); Paresh Dnyaneshwar Dalvi, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/861,747

(22) Filed: Jul. 11, 2022

(65) Prior Publication Data

US 2023/0028634 A1   Jan. 26, 2023

(30) Foreign Application Priority Data

Jul. 15, 2021 (IN) .............................. 202111031822
Jul. 22, 2021 (IN) .............................. 202111032960

(51) Int. Cl.
*F16L 11/12* (2006.01)
*B32B 1/08* (2006.01)
(Continued)

(52) U.S. Cl.
CPC .............. *F16L 11/125* (2013.01); *B32B 1/08* (2013.01); *B32B 7/08* (2013.01); *B32B 7/10* (2013.01); *B32B 9/005* (2013.01); *B32B 9/043* (2013.01); *B32B 15/02* (2013.01); *B32B 15/06* (2013.01); *B32B 15/08* (2013.01); *B32B 25/02* (2013.01); *B32B 25/20* (2013.01); *B32B 27/322* (2013.01); *B32B 37/02* (2013.01); *C04B 35/488* (2013.01); *C04B 35/505* (2013.01); *F16L 11/087* (2013.01); *F16L 11/10* (2013.01); *F16L 59/029* (2013.01); *B32B 2250/03* (2013.01); *B32B 2250/05* (2013.01); *B32B 2264/1021* (2020.08); *B32B 2307/3065* (2013.01); *B32B 2307/51* (2013.01); *B32B 2307/52* (2013.01);
(Continued)

(58) Field of Classification Search
CPC ........ F16L 11/125; F16L 11/087; F16L 11/10; F16L 59/029; B32B 1/08; B32B 7/08; B32B 7/10; B32B 9/005; B32B 9/043; B32B 15/02; B32B 15/06; B32B 15/08; B32B 25/02; B32B 25/20; B32B 27/322; B32B 37/02
See application file for complete search history.

(56) References Cited

U.S. PATENT DOCUMENTS 3,803,816 A * 4/1974 McGuire ................ G21C 3/041
                                                                55/525
3,875,971 A * 4/1975 Hamling ................ C04B 35/80
                                                                138/146

(Continued)

OTHER PUBLICATIONS

Di-Cup® Dicumyl Peroxide Technical Information, Arkema, Inc., 4 pages (2009).

(Continued)

*Primary Examiner* — David R Deal
(74) *Attorney, Agent, or Firm* — Merchant & Gould P.C.

(57) ABSTRACT

A hose is provided capable of meeting fireproof requirements per AS1055 under no flow condition. The hose has multiple layers including a yttria-stabilized zirconia (YSZ) flexible ceramic substrate layer disposed between first and second silicone rubber layers.

8 Claims, 3 Drawing Sheets (51) Int. Cl.
| | | |
|---|---|---|
| *B32B 7/08* | (2019.01) | |
| *B32B 7/10* | (2006.01) | |
| *B32B 9/00* | (2006.01) | |
| *B32B 9/04* | (2006.01) | |
| *B32B 15/02* | (2006.01) | |
| *B32B 15/06* | (2006.01) | |
| *B32B 15/08* | (2006.01) | |
| *B32B 25/02* | (2006.01) | |
| *B32B 25/20* | (2006.01) | |
| *B32B 27/32* | (2006.01) | |
| *B32B 37/02* | (2006.01) | |
| *C04B 35/488* | (2006.01) | |
| *C04B 35/505* | (2006.01) | |
| *F16L 11/08* | (2006.01) | |
| *F16L 11/10* | (2006.01) | |
| *F16L 59/02* | (2006.01) | |

(52) U.S. Cl.
CPC ... *B32B 2307/54* (2013.01); *B32B 2307/5825* (2013.01); *B32B 2307/732* (2013.01); *B32B 2327/18* (2013.01); *B32B 2383/00* (2013.01); *B32B 2597/00* (2013.01); *B32B 2605/18* (2013.01)

(56) References Cited

U.S. PATENT DOCUMENTS

| | | | | |
|---|---|---|---|---|
| 5,004,629 A | * | 4/1991 | Svec | F27D 1/045 427/205 |
| 5,103,871 A | * | 4/1992 | Misawa | H01M 8/1231 138/148 |
| 8,409,682 B2 | | 4/2013 | Fukaya et al. | |
| 9,284,227 B2 | * | 3/2016 | Niccolls | B32B 27/304 |
| 10,190,706 B2 | | 1/2019 | Mentink | |
| 11,009,155 B2 | | 5/2021 | Schilling et al. | |
| 2010/0263761 A1 | * | 10/2010 | Niccolls | B32B 9/005 138/146 |
| 2010/0266788 A1 | * | 10/2010 | Niccolls | F16L 58/181 428/447 |
| 2010/0266790 A1 | * | 10/2010 | Kusinski | C04B 35/5805 428/428 |
| 2011/0017305 A1 | * | 1/2011 | Williams, Jr. | H03D 3/02 138/146 |
| 2019/0011074 A1 | * | 1/2019 | Fuller | B32B 25/047 |
| 2019/0154174 A1 | | 5/2019 | Schilling et al. | |
| 2019/0247685 A1 | | 8/2019 | Kolte et al. | |

OTHER PUBLICATIONS

Thin E-Strate®: Ultra-Thin Ceramic Membranes for Extreme Temperature Applications, ENrG(TM) Inc., 2 pages (2012).

Loctite® 406 (TM) Technical Data Sheet, Loctite®, 3 pages (Feb. 2012).

Xiamter(TM) Modifiers, Technical Data Sheet, Form No. 95-1015, The Dow® Chemical Company, 4 pages (2017).

Min-U-Sil® Fine Ground Silica, Product Data, US Silica®, 1 page (2017).

Xiamter(TM) Silicone Modifiers: Modifier Selection Guide, The Dow Chemical Company(TM), 2 pages (2018).

Firebrake® ZB, Product Data Sheet, 20 Mule Team, Borax(TM), Rio Tinto, 2 pages (2020).

Elastosil® R 401/60 S: High Consistency Silicone Rubber (HCR), Wacker Chemie AG, 3 pages (2021).

Loctite® SF 770 Technical Data Sheet, Loctite®, 3 pages (May 2021).

* cited by examiner

YSZ CERAMIC SUBSTRATE PROTECTED FIREPROOF HOSE

CROSS-REFERENCES TO RELATED APPLICATIONS

This application claims the benefit of priority to Indian Provisional Application No. 202111031822, filed on Jul. 15, 2021 and Indian Provisional Application No. 202111032960. filed Jul. 22, 2021, the contents of each of which is incorporated by reference herewith in its entirety.

BACKGROUND OF THE DISCLOSURE

Aerospace conveyance products (hoses, tubes, etc.) may be used to convey pressurized fuel, oil, or hydraulic fluid in locations which may be exposed to fire. In such applications, a fire protection mechanism may be utilized to ensure that the product does not fail (e.g., leak) within a specified duration of time (e.g., 5 to 15 minutes) under specified conditions including specified flow conditions.

Some aircraft hoses may be certified for use in fire zones as defined by the Federal Aviation Administration (FAA) or applicable certifying authority. For example, aircraft hoses can be configured to withstand direct flame for a certain period of time, for example, five minutes or fifteen minutes, in order to be certified as being fire resistant or fire proof, respectively. Existing aircraft hoses suitable for use in fire zones may be prone to degradation during exposure to fire, which may impact product capability to meet the fire requirement.

In aerospace applications, as aircraft systems have evolved, fire test requirements have become more severe, posing challenges in demonstrating compliance with existing fireproofing technologies. For example, some current fireproof covers may not consistently meet AS1055 and TSO fire performance requirements that permit some or no-flow of fluid through the fluid conveying product during testing, let alone AS1055 no-flow requirements demanded of next-generation fluid conveying products.

U.S. Pat. No. 8,409,682 discloses a heat resistant air hose for diesel engines having an outer layer containing a non-peroxide cross-linkable ethylene acrylic rubber such as an ethylene-methacrylate copolymer and a non-halogen flame retardant such as aluminum hydroxide.

U.S. Pat. No. 10,190,706 discloses a flame resistant hose assembly having an external flame resistant layer comprising a polymeric material and expandable graphite.

U.S. Published Application US 2019/0154174 discloses a fire zone hose including a thermal protection sleeve and an outer braided stainless steel reinforcement.

U.S. Published Application US 2019/0247685 discloses a fireproof cover for fluid conveyance products including alternating intermediate layers of basalt tape and fiberglass.

To meet the zero flow AS1055 and TSO requirements, many existing hoses have to be covered with a fire sleeve designed per AS1072. Fire sleeves increase the outer diameter (OD) of the hose, add weight, and may have wrinkled surfaces, which causes difficulty during clamping of theses hoses in aircraft.

Some existing fire protection technologies may include integral silicone covers or silicone-coated fiberglass sleeves. When silicone is exposed to fire, it may form a non-uniform char, and may have a tendency to fall off from the surface. This can expose an inner PTFE layer to the fire, which can result in hose leakage due to melting of the PTFE layer.

There is a desire for solutions/options that minimize or eliminate one or more challenges or shortcomings of fluid conveyance products, such as to meet more stringent no-flow conditions under AS1055 and TSO fire performance requirements.

SUMMARY OF THE INVENTION

A fireproof hose has been designed that is suitable for use in aircraft to meet AS1055 and TSO requirements for 15 minutes under no flow conditions.

A fireproof hose is provided having a flexible ceramic substrate layer as a fire shock resistant layer. For example, the fireproof hose may include one or more, or two or more, yttria-stabilized zirconia (YSZ) ceramic substrate layers. The YSZ ceramic substrate layer(s) may be intermediate layer(s). For example, a YSZ ceramic substrate layer may be sandwiched between two silicone layers. The fireproof hose may further comprise a metallic reinforcement layer. The fireproof hose may comprise an innermost tube layer comprising a PTFE. The fireproof hose may comprise a metallic reinforcement layer over an innermost tube layer comprising a PTFE. In embodiments, the fireproof hose may include from outside inwards: an outer silicone rubber layer; a YSZ ceramic substrate layer; an inner silicone rubber layer; a metallic reinforcement layer; and an innermost PTFE tube layer.

The fireproof hose may include from inside outwards an inner tube prepared from a composition comprising PTFE, a metallic reinforcement layer, and an outer thermal insulation layer. The thermal insulation layer may comprise an inner first silicone rubber layer, an intermediate YSZ ceramic substrate layer, and an outer second silicone rubber layer.

The first and second silicone layers may be prepared from a composition comprising a silicone base rubber.

A thermal insulating layer silicone rubber composition is provided that when cured passes the flame resistance test when tested under MSHA ASTP5007. The thermal insulating layer comprising a YSZ ceramic substrate layer between two silicone rubber composition layers, when cured may pass flame resistance test when tested under MSHA ASTP5007 after 5 minutes and/or after 15 minutes.

A fireproof hose is provided comprising a thermal insulating layer comprising a yttria-stabilized zirconia (YSZ) flexible ceramic substrate layer disposed between a first silicone rubber layer and a second silicone rubber layer. The fireproof hose may further comprise an inner tube layer prepared from a composition comprising a polytetrafluoroethylene (PTFE). The fireproof hose may further comprise one or more reinforcing layers. The reinforcing layer may be disposed between the inner tube layer and the thermal insulating layer.

In some embodiments, the YSZ ceramic substrate layer comprises zirconia ($ZrO_2$) and from about 3 mol % to about 8 mol % yttria ($Y_2O_3$). The YSZ ceramic substrate layer may have a thickness within a range of from about 20 microns to about 100 microns; about 20 microns to about 50 microns; or about 40 microns.

The fireproof hose may include a first silicone rubber layer and a second silicone rubber layer prepared from a silicone rubber composition comprising from about 40-80 wt %, or about 50-70 wt % of a silicone base rubber. The silicone rubber composition may comprise one or more, two or more, or three or more additives selected from the group consisting of curing agents, process aids, fire retardants, adhesion promoters, antioxidants, ultraviolet light stabilizers, fillers, thixotropic agents, additional silicones, dyes, and colorants.

The silicone rubber composition may comprise a ground silica filler in an amount between from about 0-30 wt %, 1-20 wt %, 5-15 wt %, or about 10-12 wt %. The silicone rubber composition may comprise a zinc borate fire retardant. The reinforcing layer may comprise a metallic braid. The reinforcing layer may comprise a stainless steel metallic braid.

A fireproof hose is provided comprising a multiplicity of layers, including from an inner to an outer radial direction comprising: i) an inner tube layer prepared from a composition comprising a PTFE; ii) a first reinforcing layer comprising a metallic braid; iii) a first silicone rubber layer; iv) a YSZ ceramic substrate layer; and v) a second silicone rubber layer. The first and second silicone rubber layers may exhibit: i) hardness of 65 to 75 Shore A under ASTM 2240; ii) tensile strength of at least 750 psi under ASTM D412; iii) percent elongation of at least 150% under ASTM D412; iv) tear resistance of at least 50 Die C under ASTM D624; v) 50% Modulus of from 250 to 350 psi under ASTM D412; and vi) 100% Modulus of from 300 to 450 psi under ASTM D412.

The fireproof hose may include a thermal insulating layer comprising a cured silicone rubber composition layer and a YSZ ceramic substrate layer that passes flame resistance test when tested under MSHA ASTP5007; and exhibits high outer visual char formation when tested under MSHA ASTP5007. The fireproof hose preferably meets or exceeds 15 minute AS1055 and TSO performance requirements under no flow conditions.

A fireproof hose is provided, wherein the hose meets or exceeds 5 minute and/or 15 minute AS1055 and TSO performance requirements under no flow conditions.

A fireproof hose is provided, wherein the hose is rated for a continuous operating temperature range of −65° F. to +450° F. (−54° C. to +232° C.).

A fireproof hose is provided, wherein the hose is rated for an operating pressure of between about 1000 to about 1500 psig.

A method of making a fireproof hose is provided comprising forming an inner tube layer prepared from a composition comprising a PTFE; braiding a first reinforcing layer comprising a metallic braid over the inner tube layer; extruding a first silicone rubber composition over the reinforcing layer to form a first silicone layer, wrapping or rolling a YSZ ceramic substrate material over the first silicone layer to form a YSZ ceramic substrate layer; extruding or injection molding second layer of silicone over the YSZ ceramic substrate layer to form a second silicone layer and form a green hose; and curing the green hose to form the fireproof hose. Optionally any appropriate adhesive may be employed, for example, between a silicone rubber layer and a YSZ ceramic substrate layer.

DETAILED DESCRIPTION OF THE INVENTION

A fireproof hose is provided including multiple layers of thermal insulation covering over a standard metallic hose. These insulations layers include a YSZ ceramic substrate layer that exhibits significant improvement in fire protection properties over existing technologies. The hose is suitable for use in aircraft or aerospace vehicle fluid systems. For example, the fireproof hose may be used for fuel, oil, and hydraulic lines.

A "fire-proof" hose line as defined by the FAA must withstand a direct flame for 15 minutes under specified flow conditions without failure. Fire-resistant lines must withstand a 5 minute exposure under these conditions.

A zero flow fireproof hose is provided including a fire resistant thermal insulating layer comprising a YSZ ceramic substrate layer. YSZ ceramic substrate has proven to be an excellent thermal shock resistant material. YSZ ceramic substrate demonstrates no loss in structural and thermal integrity at temperatures of 2200 deg F. (1204 deg C.), which is more than the AS1055 requirement (2000 deg F.; 1093 deg C.). The high temperature stability makes YSZ ceramic substrate a best in class material for use in the present applications.

Yttria-stabilized zirconia (YSZ) is a ceramic in which the cubic crystal structure of zirconium dioxide is made more stable at room temperature by addition of yttrium oxide. Zirconium dioxide is commonly called "zirconia" ($ZrO_2$). Yttrium oxide is commonly called "yttria" ($Y_2O_3$). YSZ may include a molecular formula $ZrO_2+Y_2O_3$.

Stabilization of the cubic polymorph of zirconia over a wide range of temperatures may be accomplished by substitution of some of the $Zr^{4+}$ ions (ionic radius of 0.82 Angstroms, Å) in the crystal lattice with slightly larger ions, e.g., those of $Y^{3+}$ (ionic radius of yttria 0.96 Angstroms, Å). The resulting doped zirconia materials are called stabilized zirconias. YSZ ceramic substrate may be partially stabilized or fully stabilized. Commonly used abbreviations and acronyms used in conjunction with partially stabilized YSZ may include "PSZ" partially stabilized zirconia, "YSZ3" 3 mole % yttria-stabilized zirconia, "YSZ4" 4 mole % yttria-stabilized zirconia, and "TZP" tetragonal zirconia polycrystal. Commonly used abbreviations and acronyms used in conjunction with fully stabilized YSZ may include "FSZ" fully stabilized zirconia, "CSZ" cubic stabilized zirconia, and "YSZ8" 8 mole % $Y_2O_3$ fully stabilized zirconia $ZrO_2$. The partially stabilized YSZ may be YSZ3. Yttria (3 mol %) stabilized zirconia, YSZ3, may comprise about 94.5 wt % $ZrO_2$ and 5.2+/−0.2 wt % $Y_2O_3$. The YSZ3 specific density may be ≥5.95 $g/cm^3$; hardness (HV) may be >12 GPa; elastic modulus about 205 GPa. The YSZ ceramic substrate may be any appropriate commercially available YSZ ceramic substrate such as ENrG™ Inc. Thin E-Strate® ultrathin ceramic membranes.

Flexible ceramic substrates may include YSZ. The YSZ flexible ceramic substrate layer may have a thickness within a range of from about 20 microns to about 100 microns; about 20 microns to about 50 microns; or about 40 microns in thickness, or any thickness in between. In embodiments, the YSZ ceramic substrate layer is about 20 microns; about 40 microns; about 50 microns; or about 100 microns in thickness. The YSZ ceramic layer may be sandwiched between 2 layers of silicone rubber. This arrangement was found to control the first layer silicone from falling off during the AS1055 fire testing. The presence of the flexible ceramic layer between silicone layers resulted in improved and localized char formation.

The YSZ ceramic substrate layer may be sandwiched between two layers of silicone. Due to its extremely high thermal shock resistance for an extended period of time, the YSZ ceramic substrate prevents the inner silicone layer from producing a non-uniform char, and hence, from falling off.

The terminology used herein is for the purpose of describing particular embodiments only and is not intended to be limiting of the disclosure.

The singular forms "a", "an" and "the" are intended to include the plural forms as well, unless the context clearly indicates otherwise.

The term "and/or" refers to and encompasses any and all possible combinations of one or more of the associated listed items.

As used herein, the term "about" means within ten percent (10%) of the given value, either ten percent more than the given amount or ten percent less than the given amount, or both.

As used herein, the term "composition" refers to one or more of a compound, mixture, blend, alloy, polymer and/or copolymer.

As provide herein, ranges are intended to include, at least, the numbers defining the bounds of the range.

Unless otherwise specified, % values refer to weight %.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms used in the description, have the same meaning as commonly understood by one of ordinary skill in the art to which this disclosure belongs. In the event of conflicting terminology, the present specification is controlling.

All patents, patent applications and publications referred to herein are incorporated by reference in their entirety.

Thermal conductivity W/m*K measures how well a material spreads heat within itself. Where W is thermal energy, K is temperature difference $\Delta T=T_1-T_2$ (K) between each side of the material, m is material thickness. In other words, thermal conductivity is the rate at which heat penetrates through a given material. The thermal conductivity (@ 25° C.) for the YSZ ceramic substrate may be about $6.7\times10^{-3}$ cal/cm·s° C.

Coefficient of thermal expansion ($1\times10^{-6}$/deg C.) defines how much a material expands or contracts based on external temperatures. Ceramics may have a low coefficient due to their strong interatomic bonds, making them more stable across wide temperature ranges. The coefficient of thermal expansion (25-800° C.) for the YSZ ceramic substrate material may be about $9.5\times10^{-6}$/° C.

Specific heat (J/kg*K) measures how easy or difficult it is to raise the temperature of a material. In high-temperature applications, where regulating temperature is critical, this measurement may help determine what materials will perform best.

Thermal shock resistance (° C.) measure the ability to withstand dramatic and sharp temperature changes. Ceramic formulations that display high thermal shock resistance minimally expand or contract during extreme temperature changes.

The properties of the materials may be tested in accordance with the following standards. Flame resistance was performed according to MSHA ASTP5007 under 30 CFR § 18.65; and Char formation is a visible test after MSHA ASTP5007. Material properties may be tested under ASTM D412 (Tensile, elongation & modulus); ASTM D2240 (hardness). Shore A Hardness test may be performed in accordance with ASTM D 2240-95, for example, using a calibrated Instron automatic Durometer tester.

Figure 5:
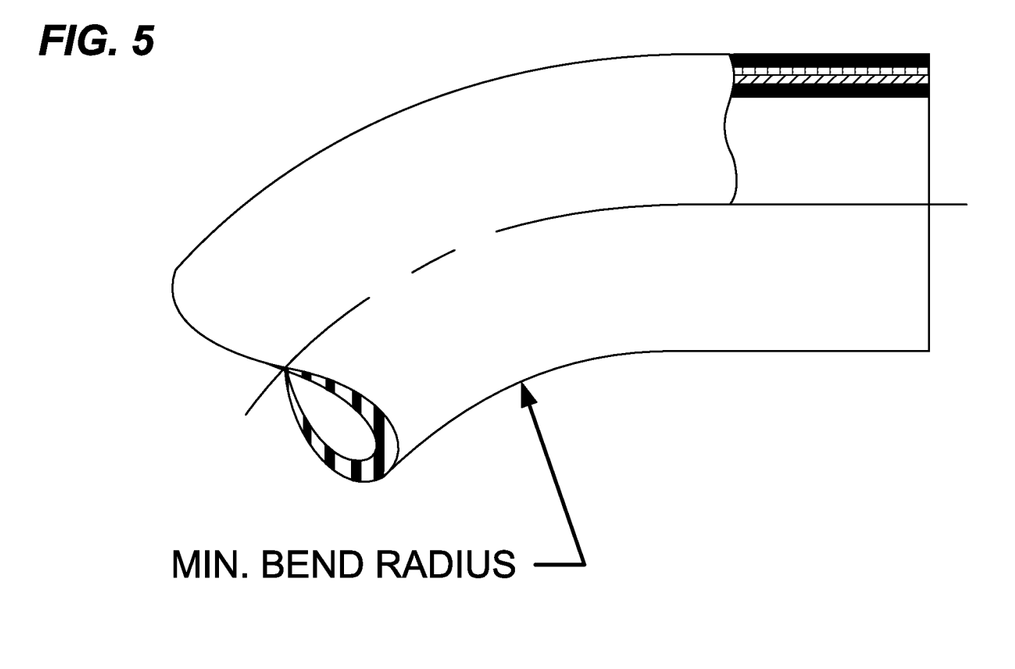
FIG. 5 shows an illustration of minimum bend radius test.

Bend radius refers to the radius of a bent section of hose measured to the innermost surface of the curved portion. Minimum bend radius as shown in FIG. 5 refers to the smallest radius at which a hose can be used. When bent at too sharp of an angle, a hose may kink or flatten in the cross-section.

SAE 1055 D Aerospace Standard (AS) establishes uniform requirements for fire testing of flexible hose assemblies to be used in aircraft or aerospace vehicle fluid systems. FAA Technical Standard Orders (TSO) are the performance qualifications for aircraft parts, materials, etc. TSO-053a cover Fuel and Engine Oil System Assemblies. TSO-C75 covers hydraulic hose assemblies. Fire protection, fire resistant (5 minute) of fire proof (15 minute) may be designated as "Class A" or "Class B", respectively. Specific low flow rate (for example, fuel and lube oil may be tested at $5\times ID^2=x$ GPM or hydraulic at $1\times ID^2=x$ GPM) or no flow testing may be accomplished for selected hose type, size and configuration assemblies. The flow rate, duration of fire test, performance requirements may be specified. AS1055 also defines hose types by material (Type I is Rubber; Type II is PTFE, Type III is rigid (metal) tubing); function (for example, (a) fuel and lube (similar to TSO-053a) or (b) hydraulic (similar to TSO-C75) wherein fluid flow is specified; and compatibility where S is Synthetic fluid and P is petroleum base fluid.

A hose is provided comprising multiple insulation layers that can consistently meet zero flow fireproof condition AS1055 and TSO requirement without addition of external fire sleeve per AS1072. The hose may meet AS1055 fire resistance requirements under no flow conditions for 5 minutes and/or 15 minutes.

The fireproof hose of the disclosure may provide further advantages of at least about a 10% weight reduction, and/or at least about 2-5%, or up to about 15% envelope reduction compared to existing solutions for zero flow condition. The hose may be a wrinkle free hose including a smooth OD for ease of clamping.

A hose is provided suitable for carrying various fluids under aerospace conditions including fuel, oil, or hydraulic fluids including synthetic fluids such as phosphate ester hydraulic fluids (e.g., a SKYDROL™ aviation hydraulic fluid, Eastman Aviation).

A fireproof hose is provided having a multiplicity of layers. The fireproof hose may include an outer layer prepared from a composition that includes a silicone base rubber.

Figure 1:
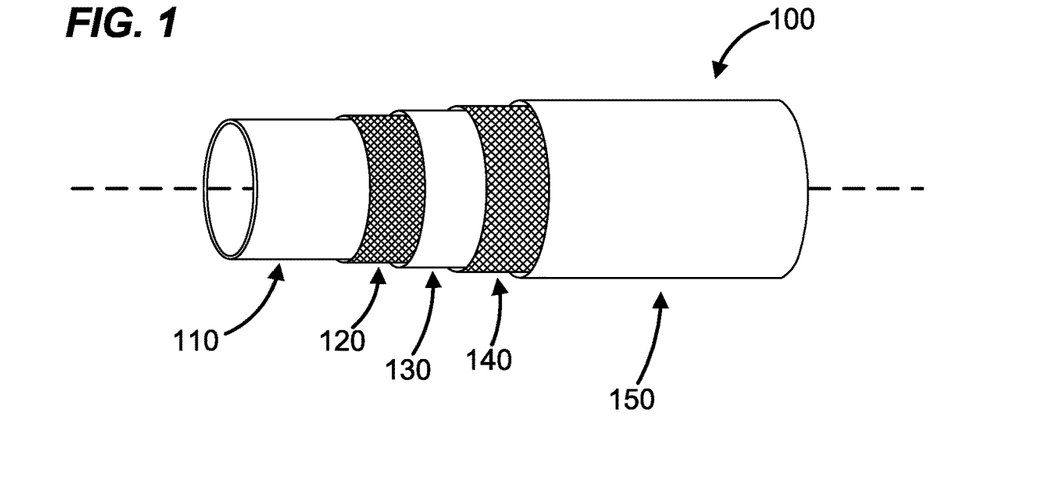
FIG. 1 shows an exemplary fireproof hose construction comprising 5-layers.

The fireproof hose of FIG. 1 may be prepared in the hose sizes shown in Table 1.

TABLE 1

Fireproof Hose Sizes, Pressure Specifications and Minimum Bend Radius

| Hose Size | Operating Pressure psig | Proof Pressure psig | Burst Pressure Room Temp Min psig | Burst Pressure High Temp Min psig | Bend Radius at Inside of Bend inch |
|---|---|---|---|---|---|
| 03 | 1500 | 3000 | 12 000 | 7000 | 2.00 |
| 04 | 1500 | 3000 | 12 000 | 7000 | 2.00 |
| 05 | 1500 | 3000 | 10 000 | 6500 | 2.00 |
| 06 | 1500 | 3000 | 9000 | 6500 | 4.00 |
| 08 | 1500 | 3000 | 8000 | 6000 | 4.63 |
| 10 | 1500 | 3000 | 7000 | 5500 | 5.50 |
| 12 | 1000 | 2000 | 5000 | 3500 | 6.50 |
| 16 | 1250 | 2500 | 5000 | 3500 | 7.38 |
| 20 | 1000 | 2000 | 4000 | 3000 | 11.00 |
| 24 | 1000 | 2000 | 4000 | 3000 | 14.00 |

A fireproof hose according to the disclosure may be prepared in any suitable hose size, for example, the hose sizes shown in Table 1, including -03, -04, -05, -06, -08, -10, -12, -16, -20, or -24. The fireproof hose of the disclosure may be rated as a medium pressure hose or a high pressure hose. For example, the fireproof hose of the disclosure may have an operating pressure between 1000 and 1500 psig, or 1000, 1250 or 1500 psig depending on the size on hose size and configuration, for example, according to Table 1. The proof pressure may be from 2000 to 3000 psig, or 2000, 2500 or 2000 psig depending on the size on hose size and configuration. The burst pressure at room temperature may be from 4000 to 12,000 psig, or 4000, 5000, 7000, 8000, 9000, 10,000, or 12,000 psig depending on the size on hose size and configuration. The burst pressure high temp min may be from 3000 to 7000 psig, or 3000, 3500, 5500, 6000, 6500, or 7000 psig depending on the size on hose size and configuration. The fireproof hose according to the disclosure may exhibit a minimum bend radius according to AS1946E specifications. The minimum bend radius at inside of bend may be from 2.00, 4.00, 4.63, 5.50, 6.50, 7.38, 11.00, or 14.00 inches depending on the size on hose size and configuration according to Table 1.

The fireproof hose may be rated for a continuous operating temperature range of −65° F. to +450° F. (−54° C. to +232° C.).

The fireproof hose may include a multiplicity of layers. The fireproof hose may include an inner tube prepared from a composition that includes a PTFE; an intermediate metallic reinforcing layer; an intermediate layer prepared from a composition comprising a silicone base rubber; a YSZ ceramic substrate layer; and an outer layer prepared from a composition that includes a silicone base rubber.

The fireproof hose may include an inner tube prepared from a composition that includes a PTFE; a second layer that is a metallic reinforcing layer; a third layer prepared from a composition that includes a silicone base rubber; a fourth layer comprising a YSZ ceramic substrate; and a fifth layer prepared from a composition that includes a silicone base rubber. The fifth layer may be the outer layer. The metallic reinforcing layers may include a metallic wire braid, for example, a stainless steel wire braid.

FIG. 1 shows an exemplary fireproof hose construction 100 comprising 5-layers. Hose 100 may include an inner tube 110, a first reinforcement layer 120, a first silicone rubber layer 130, a flexible ceramic substrate layer 140, and an outer silicone rubber layer 150. The inner tube 110 may comprise a PTFE. The reinforcement layer 120 may comprise a metallic braid. The silicone rubber layers 150 and 130 may be prepared from a composition that includes a silicone base rubber. The flexible ceramic substrate layer 140 may comprise a YSZ ceramic substrate.

Figure 2:
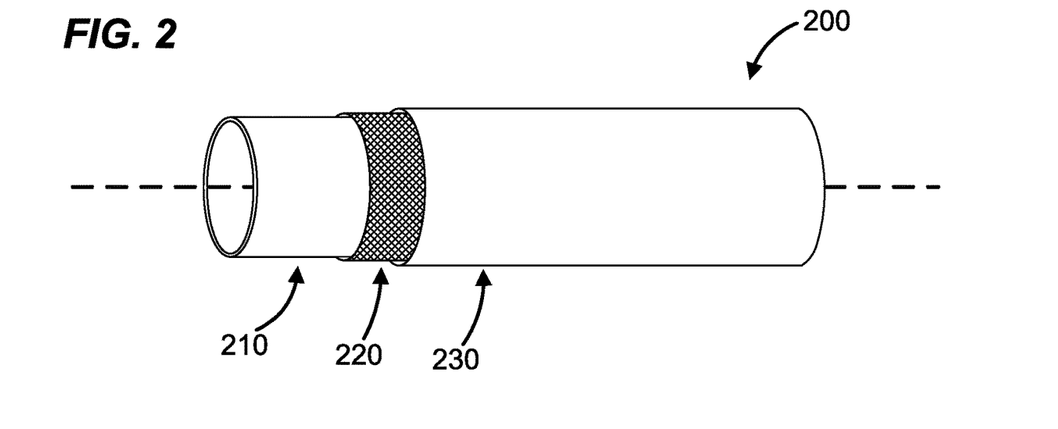
FIG. 2 shows an exemplary fireproof hose construction comprising 3-layers

FIG. 2 shows an exemplary fireproof hose construction 200 comprising 3-layers. Hose 200 may include an inner tube 210, a first reinforcement layer 220, and an outer thermal insulation layer 230. The inner tube layer 210 may comprise PTFE. The reinforcement layer may comprise a metallic braid, such as a corrosion resistant stainless steel. The external thermal insulation layer 230 may comprise an inner first silicone rubber layer, an intermediate YSZ ceramic substrate layer, and an outer second silicone rubber layer. The YSZ ceramic substrate layer may be a partially stabilized YSZ ceramic substrate.

Figure 3:
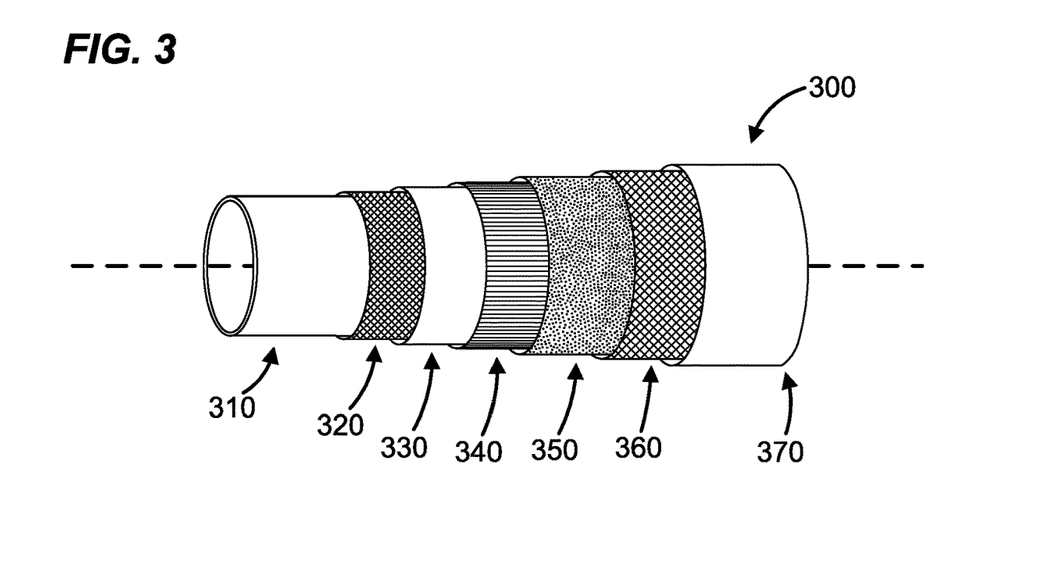
FIG. 3 shows an exemplary fireproof hose construction comprising 7-layers.

FIG. 3 shows an exemplary fireproof hose construction 300 comprising 7-layers. Hose 300 may include an inner tube 310, a first reinforcement layer 320, a first silicone rubber layer 330, a first YSZ ceramic substrate layer 340, a second silicone rubber layer 350, a second YSZ ceramic substrate 360, and an outer third silicone rubber layer 370. The inner tube 310 may comprise a PTFE. The reinforcement layer 320 may comprise a stainless steel braid. The first silicone rubber layer 330, the second silicone rubber layer 350, and the outer silicone layer 370 may be prepared from a composition that includes a silicone base rubber. The first and second YSZ ceramic substrate layers may comprise a partially stabilized ceramic substrate material. An optional fire sleeve layer may be employed. For example, a silicone coated fiberglass sleeve such as an AE102 fire sleeve may optionally be included.

The fireproof hose of the disclosure includes an inner tube layer that forms a flow path for conveying fluid. For example, the fireproof hose of FIG. 1 includes an inner tube layer 110 that may be prepared from any material suitable for substantially containing the fluid throughout an operating temperature range of the aircraft. For example, an operating temperature range of the aircraft can be between about −65° Fahrenheit (° F.) (about −54° Celsius (° C.)) and about +450° F. (about +232° C.). The fireproof hose may include an inner tube layer prepared from a composition comprising Polytetrafluoroethylene (PTFE). Among fluoropolymers, PTFE has one of the highest operating temperatures, the lowest coefficient of friction, and good abrasion and chemical resistance. The ASTM Standard D4895 refers to a PTFE resin prepared from dispersion. The PTFE resins are homopolymers of tetrafluoroethylene or modified homopolymers, for example, containing not more than 1% by weight of other fluoromonomers. The PTFE may be, for example, Chemours 62X or T62X PTFE. The PTFE may exhibit a melting point of greater than 600° F. by DTA E-168, a continuous maximum use temperature of at least about 500° F. (260° C.) under D1894, and/or an intermittent maximum use temperature of at least about 550° F. The PTFE may be any suitable PTFE, for example Type 1 Grade 4 Class B under ASTM D4895.

The inner tube composition may further include a processing and/or lubricant that aids in processing, preforming, and extrusion. The processing aid may be a liquid processing aid hydrocarbon such as naphtha or other petroleum distillates. The lubricant may be, for example, a synthetic isoparaffinic fluid, for example, an Isopar™ fluid, for example, Isopar™ R, Brenntag UK Ltd. The inner PTFE tube may be formed by a process including batch sintering of PTFE tube is 740° F. and the time varies due to reduction ration and figure into line speed.

The fireproof hose can include one or more reinforcing layers. The one or more reinforcing layers can strengthen the inner tube, for example, improve kink resistance, increase the amount of pressure that can be applied to the inner tube, and/or can improve the robustness of the fireproof zone hose during exposure to fire. The one or more reinforcing layers, for example, may include a metallic braid. The metallic braid may be, for example, a stainless steel wire braid (e.g., a corrosion resistant stainless steel, such as a 300 series stainless steel).

The fireproof hose may include an outer silicone rubber layer. The fireproof hose may include one or more silicone rubber layers. In some configurations, the fireproof hose may include an outer silicone rubber layer 150 and an intermediate silicone rubber layer 130. The fire proof hose may include a thermal insulating layer. The thermal insulating layer may comprise one or more silicone rubber layers and one or more flexible ceramic substrate layers. The thermal insulating layer may include a flexible ceramic substrate layer disposed between two layers of silicone rubber.

The silicone rubber layers may be prepared from a silicone rubber composition. The silicone rubber composition may include a silicone base rubber. The silicone rubber composition may be prepared from a silicone base rubber and optionally one or more additives. Additives may include curing agents, process aids, ultraviolet light stabilizers, fillers, thixotropic agents, additional silicones, dyes, and colorants. The first and/or second silicone rubber layers may be prepared from a composition comprising a silicone rubber base and a fire retardant additive. The silicone rubber may be a solid or liquid silicone rubber. The silicone rubber may be a solid silicone rubber. Uncured silicone rubber contains polymers of different chain lengths comprising a principal silicon-oxygen chain (the siloxane backbone) and an organic moiety bound to the silicon. A silicon atom has four valence electrons which is why silicone rubber may be abbreviated with a Q for "quaternary group". Silicone rubbers, or polysiloxanes, are the only type of rubbers having an inorganic main chain, for example, (—O—SiR$_2$—O—SiR$_2$—O—SiR$_2$—O—), with organic side chains R attached to the Si atoms. For example, the silicone rubber may have general main chain chemical formula —[R$_2$SiO]n-, where R=alkyl (methyl —CH$_3$, ethyl —CH$_2$CH$_3$), vinyl (—CH=CH$_2$), or phenyl (—C$_6$H$_5$) groups. The organic groups on the polysiloxane backbone may be methyl, vinyl, and/or phenyl groups. Thus the silicone rubber may include polydiorganosiloxanes. Other rubbers may have a carbon-hydrogen organic main chain, for example, (—CH2-CH2-CH2-CH2-CH2-), for example, optionally further comprising an organic side group. The silicone rubber may include an MQ, VMQ, FVMQ, and/or PVMQ silicone rubber. MQ silicone rubbers include polydimethylsiloxanes (R=methyl). VMQ silicone rubbers are similar to polydimethylsiloxanes (MQ), but some of the methyl groups have been replaced with vinyl groups (R=methyl, vinyl). The double bond of the vinyl group is a reactive group which may be used for crosslinking. PVMQ silicone rubbers have a small portion of the methyl groups of a VMQ replaced with phenyl groups (R=methyl, vinyl, phenyl). FVMQ is a VMQ in which a small number of methyl groups have been replaced by trifluoropropyl substituents. The silicone rubbers may have predominantly methyl side groups (—CH$_3$), or optionally a few vinyl side groups to help with crosslinking. (e.g., —CH=CH$_2$). Many commercial grades are VMQ type. Phenyl groups (e.g., C$_6$H$_5$) may be added to improve low temperature properties. These are PVMQ types. Optional addition of fluoro groups may improve oil and fuel resistance. These are the FVMQ types. The outer thermal insulating layer may be prepared from a composition comprising a silicone base rubber selected from one or more of a VMQ, PVMQ, and/or FVMQ. The silicone rubber may include a VMQ silicone. The silicone rubber may be a non-halogen silicone rubber. Properties of VMQ silicone rubbers include soft, low viscosity, good low temperature flexibility, excellent heat resistance, good electrical properties and medium oil resistance. Curatives for silicone rubbers may include peroxides or addition (platinum) curing systems. Processing additives such as platinum based flame retardants may be employed, such as proprietary XIAMETER RBM 9001, 9004, 9003, 9010, which may be added to improve extrusion. Properties of the silicone rubber include good thermal properties and resistance to high and low temperatures, for example, a service temperature from about −110 to 250° C. The silicone rubber exhibits the widest service temperature of all the rubbers and maintains physical properties even at high temperature. Electrical properties may include very good insulation and dielectric properties, high dielectric strength, excellent arc and tracking resistance. Physical properties may include medium to low tensile strength and tear properties, very good compression set resistance. Environmental properties may include very good resistance to oxidation, ozone and weathering, high radiation resistance, medium to good resistance to chemicals and oils. Other desirable properties may include water repellency, good flame resistance with non-toxic combustion properties.

The silicone rubber may be any silicone base rubber suitable for molded articles and extrusions. For example the silicone base rubber may include an ELASTOSIL® silicone base rubber. The silicone base rubber may be an ELASTO-SIL® R 401/60 silicone rubber (Wacker Chemie AG, Munich, Germany). The thermal insulating composition may include from about 40-80 wt %, or about 50-70 wt % of a silicone base rubber.

The silicone rubber base composition may also include one or more additives. Suitable additives may include, but are not limited to, curing agents, process aids, adhesion promoters, antioxidants, ultraviolet light stabilizers, fillers, thixotropic agents, additional silicones, dyes/colorants, and combinations thereof.

The silicone rubber base composition may also include various curing agents, including but not limited to, for example, a peroxide. For example, the peroxide cure agent may be a 50% paste of bis-(2,4-dichlorobenzoyl)-peroxide in silicone fluid, dicumyl peroxide, or a 45% paste of 2,5-bis-(t-butylperoxy)-2,5-dimethyl-hexane in silicone rubber. The curing agent may be present at from about 0.1-3 wt %, 0.3-1 wt % of the silicone rubber composition. A further organic peroxide may be employed in the composition. The further organic peroxide may be, for example, a monofunctional organic peroxide. The organic peroxide may be, for example, di(2,4-dichlorobenzoyl) peroxide. The organic peroxide may be present at, for example, 0-5 wt %, 0.1-3 wt %, or 0.5-2 wt % of the thermal insulating composition.

The silicone rubber base composition may also include various fillers, such as a ground silica SiO$_2$ filler. The fillers may be employed at a concentration between from about 0 to about 30 wt %, about 1 to about 20 wt %, about 5 to about 15 wt %, or about 10 to about 12 wt % of the silicone rubber composition.

The silicone rubber composition may also include various fire retardants. Any appropriate fire retardant known in the art may be employed. For example, the fire retardant may be a zinc borate. The zinc borate may be a zinc borate hydrate.

The zinc borate may be a dodecaboron tetrazinc docosaoxide heptahydrate. Zinc borate may release its water of hydration at temperatures exceeding about 290° C. (554° F.). The zinc borate may have a chemical formula 2 $ZnO·3B_2O_3·3.5H_2O$. The zinc borate may have a median particle size by laser diffraction of 9 microns (e.g., FIREBRAKE® ZB, US Borax, Inc.), 2.1 microns (e.g., FIREBRAKE® ZB-Fine), or 1.8 microns (e.g., FIREBRAKE® ZB-XF). The fire retardant may be present at between about 1 wt % to about 5 wt %, about 2 wt % to about 4 wt %, or about 3 wt to about 4 wt % in the silicone rubber composition.

The silicone rubber base composition may also include various pigments or colorants for example at 0.1-5 wt %, 0.2-3 wt % of the composition.

Various additional additives such as antioxidants, or process aids, may be employed in the thermal insulation composition, for example at about 0-3 wt %, or 0.1-2 wt %.

Optionally any appropriate adhesive may be employed between layers. For example, an adhesive may be employed between a silicone rubber layer and a YSZ ceramic substrate layer. The adhesive may be a cyanoacrylate adhesive. For example, the adhesive may be an ethyl cyanoacrylate adhesive such as, e.g., a LOCTITE® cyanoacrylate adhesive, e.g., LOCTITE® 406 (Henkel). A primer may be employed for surface preparation in conjunction with the adhesive. Any appropriate primer may be employed. For example, if the adhesive is a cyanoacrylate adhesive, the primer may be an aliphatic amine in isopropyl acetate for surface preparation such as, e.g., LOCTITE® SF770 primer (Henkel).

Any suitable mixer may be employed for preparing the silicone rubber compositions, which may be prepared by mixing two parts A and B. For example, a roll mill or a Banbury™ mixer (Farrel Corporation) may be used to mix the different formulations according to the disclosure, for example, under ASTM D 3182-07. For example, a silicone rubber base composition may be prepared and mixed with additives, or fillers. The composition may be extruded or molded and cured. The cured composition may be tested for physical properties, flame resistance and char formation.

The silicone rubber composition may be extruded over the inner tube or the reinforcing layers and may be cured at a temperature between 300° F. to 375° F., 300° F. to 325° F., or 340° F. to 375° F. in a molten salt bath. The composition may include a dual catalyst compound and the hi-temp catalyst doesn't cure in an oxygen environment. Silicone times are 9-15 fpm across 55 ft of salt tank.

Figure 4:
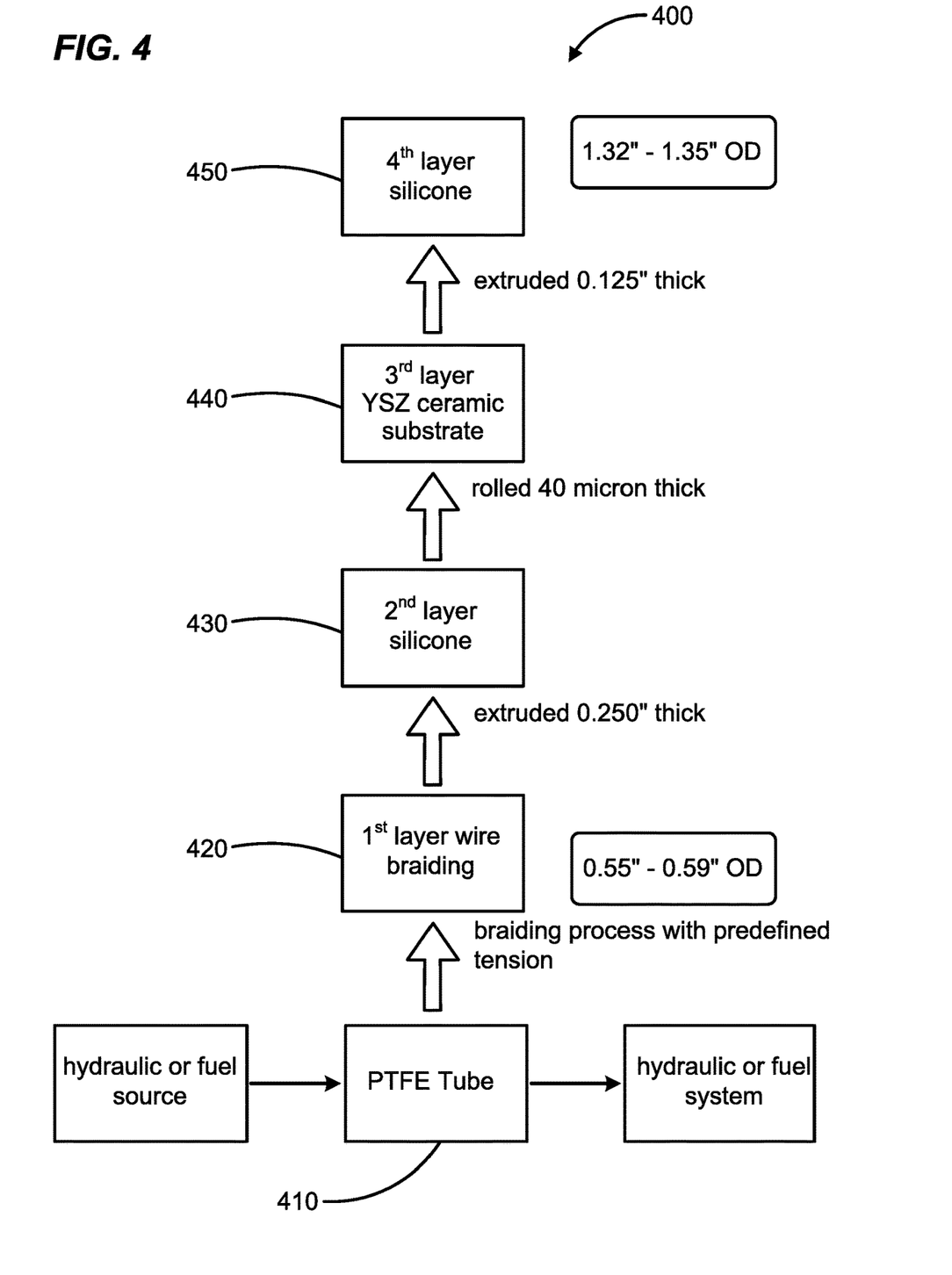
FIG. 4 shows an exemplary process for a hose construction comprising 5-layers.

FIG. 4 shows an exemplary 5-layer fireproof hose construction process 400 for preparing a fireproof hose. An inner PTFE tube 410 may be formed from a composition comprising PTFE. A first reinforcement layer 420 is formed over the PTFE tube 410 using a wire braiding process with a predefined tension, for example, having an OD of 0.55"-0.59"(inches). A first silicone rubber layer 430 is formed over the first reinforcement layer 420, for example, by extrusion from a silicone composition comprising a silicone base rubber. The first silicone layer may have a thickness in a range of, for example, 0.2"-0.3" thick, or 0.25" inches thick. The YSZ ceramic substrate layer 440 of 40 microns (0.00157") in thickness is rolled/wrapped over the silicone thermal insulating layer. The YSZ ceramic substrate layer may be a single layer with or without overlap. With overlap, the YSZ ceramic substrate layer would become 2 layers at overlaps. For example, the extent of overlapping may be from about 20% to about 50% of overlapping surface area. A second silicone rubber layer 450 is formed over the first reinforcement layer 440, for example, by extrusion from a silicone composition to form an outer layer. The second silicone rubber layer may have a thickness in a range of, for example, 0.1"-0.2" thick, or 0.125" thick. The fireproof hose 400 may have an OD of 1.32"-1.35". Higher ODs are contemplated.

To manufacture the fireproof hose 100, the inner tube 110 is initially extruded over a mandrel. If the inner tube 110 includes two or more layers, they can be co-extruded. Next, the hose reinforcing layer 120 is braided over the inner tube 110 on the mandrel. Subsequently, the first silicone rubber layer 130 is extruded over the hose reinforcing layer 120 and the inner tube 110 on the mandrel. Next, the YSZ ceramic substrate 140 may be rolled or wrapped over the first silicone rubber layer 130. Subsequently, the second silicone rubber layer 150 is extruded over the hose reinforcing layer 140 on the mandrel. The assembly can be passed through a water cooling tank to help it set cool slightly. If a flexible mandrel is being used, the hose can then be coiled. The hose is then put into an autoclave for curing. Thereafter, the mandrel is ejected from the hose using pressure. It will be appreciated that the fireproof hose of FIG. 2 or FIG. 3 can be manufactured in a similar manner.

EXAMPLES

Example 1. Silicone Composition

A representative silicone rubber composition is shown in Table 2.

TABLE 2

Silicone Composition

| Description | Quantity (lbs.) | % | phr |
|---|---|---|---|
| Elastosil ® ELR401/60 Silicone Base rubber | 109.0 | 68.1 | 95-105 |
| FR3 fire resistant fluid (Xiameter ®RBM-9003 modifier) | 20.7 | 12.9 | 15-25 |
| Minusil 5 Micron -ground silica SiO2 | 18.5 | 11.6 | 15-25 |
| Di-Cup 40KE -dicumyl peroxide catalyst | 0.8 | 0.5 | 0.5-2 |
| Soligum Red 058 Rubber | 1.2 | 0.8 | 0.5-2 |
| CM126 Black Silicone | 0.4 | 0.2 | 0.5-2 |
| Silogum Blue 211 | 2.2 | 1.4 | 1-3 |
| Firebrake ZB-zinc borate fire retardant | 5.5 | 3.4 | 3-8 |
| Perkadox PD-50S-PS-A-organic peroxide | 1.7 | 1.1 | 1-3 |
| Totals | 160.0 | 100 | |

Specifically, a silicone rubber was prepared from the composition of Table 2 by mixing on mill. The samples were cured 10 min at 300° F. (149° C.). A hose may be cured for example, at a temperature between about 300° F. and 375° F., about 300° F. and about 325° F., or about 340° F. and about 375° F. in a molten salt bath.

Physical properties were tested in accordance with ASTM D412 (Tensile, elongation & modulus); ASTM D2240 (hardness); ASTM D624 (tear resistance, Die C); Flame resistance was performed according to MSHA ASTP5007 under 30 CFR § 18.65; and Char formation is a visible test after MSHA ASTP5007; Shore A Hardness test was performed in accordance with ASTM D 2240-95, for example, using a calibrated Instron automatic Durometer tester. Hardness durometer, Shore A 70+/−5; tensile ≥750 psi; percent elongation ≥150%; tear resistance, Die C ≥50; specific gravity 1.42+/−0.03.

Example 2. Flame Resistance Test

A flame test was performed according to MSHA ASTP 5007 standard flame test procedure under 30 CFR Part 18, § 18.65. Samples were prepared comprising a silicone composition similar to Table 2 and cured. Specimens of the cured silicone rubber test samples were subjected to the flame resistance test. Specimens were mounted to support stand with ring clamp and wire gauze inside test cabinet. A variable speed electric fan and ASME flow nozzle to attain constant air velocities between 50-500 feet a minute. A Pittsburgh-Universal Bunsen-type burner is mounted in test cabinet and is adjusted to give a blue flame 3 inches in height with natural gas. The sample was held 4" from the flame in a vertical position. The burner flame was applied to the free end of the specimen. At the end of 1 minute the burner flame is removed, the ventilating fan turned on the give an air current of 300 feet per minute and the duration of flame is measured using a stop watch. The samples were placed between an industrial blow torch and a thermocouple, having sensing range temperature 2000° F. and heat flow rate: 4500 Btu/hr. Samples tested with an industrial burner torch with a temperature >2000 deg F. Test duration for all samples was 5 minutes.

Several iterations of possible fireproof hose formats were tested.

Layer format and results for the Flame Resistance Test are shown in Table 3. Layer 1 was closest to blow torch flame.

TABLE 3

Hose construction for Flame Testing

| Iteration | Layer 1 | Layer 2 | Layer 3 | Layer 4 | Visual appearance |
| --- | --- | --- | --- | --- | --- |
| 1 | Silicone rubber 0.125" | Silicone rubber 0.25" | na | na | Burning occurred all the way through. Silicone char formation and fall off was noticeable on both first and second layer |
| 2 | Silicone rubber 0.125" | YSZ ceramic substrate 40 micron | Silicone rubber 0.25" | na | Light char formation on the front of the second silicone was noticed. However, no silicone swelling or burning on the backside of the second silicone layer was noticed. |
| 3 | YSZ ceramic substrate 40 micron | Silicone rubber 0.125" | YSZ ceramic substrate 40 micron | Silicone rubber 0.25" | First silicone layer burning was localized and did not spread to ends as in iteration 2. Second silicone front side layer was pristine and so was back side. |
| 4 | Silicone rubber 0.123" | na | na | na | Single layer of silicone was tested. The burning occurred all the way through. Cracks noticed on backside of layer. |
| 5 | YSZ ceramic substrate 40 micron | Silicone rubber 0.123" | na | na | Front layer showed no char formation. Burning was localized and char/cracks did not spread to the ends. The back side of the silicone was prostine with no char formation or any visible cracks. |

Based on flame resistance test results, a thermal resistant layer format comprising a YSZ ceramic substrate layer sandwiched between two silicone rubber layers (iteration 2) was selected for fireproof hose construction.

Example 3. Fireproof Hose Comprising PTFE Inner Core Tube and Outer Thermal Insulating Layer Comprising YSZ Ceramic Substrate A prototype hose is prepared according to the invention, comprising a PTFE inner tube 110 (Chemours 62X PTFE). A 304 stainless steel braid reinforcing layer 120 is applied using a braiding process with predefined tension to prepare reinforced tube having 0.55"-0.59" OD (outer diameter). A first silicone rubber layer 130 is extruded over the reinforcing layer to a thickness of 0.25", a YSZ ceramic substrate layer 140 is rolled onto layer 130, and a second silicone rubber outer layer 150 according to Table 2 is extruded over the YSZ ceramic substrate layer 140 to a thickness of 0.125". The cured hose has a 1.32" to 1.35" OD. Following cure, the hose will meet AS1055 and TSO fire performance requirements under zero flow conditions, pass the flame resistance test under MSHA ASTP5007, an exhibit good external char formation.

What is claimed is:

1. A method of making a fireproof hose comprising:
   forming an inner tube layer prepared from a composition comprising a PTFE;
   braiding a first reinforcing layer comprising a metallic braid over the inner tube layer;
   extruding a first silicone rubber composition over the reinforcing layer;
   rolling a yttria-stabilized zirconia (YSZ) ceramic substrate layer over the first silicone rubber layer;
   extruding a second silicone rubber composition over the YSZ ceramic layer to form a green hose; and
   curing the green hose to form the fireproof hose.

2. The method of making the fireproof hose of claim 1, wherein the YSZ ceramic substrate layer comprises zirconia ($ZrO_2$) and from about 3 mol % to about 8 mol % yttria ($Y_2O_3$).

3. The method of making the fireproof hose of claim 1, wherein the YSZ ceramic substrate layer has a thickness of from about 20 micrometers to about 100 micrometers.

4. The method of making the fireproof hose of claim 1, wherein the first and second silicone rubber layers are prepared from a silicone rubber composition comprising from about 40-80 wt %, or about 50-70 wt % of a silicone base rubber.

5. The method of making the fireproof hose of claim 4, wherein the silicone rubber composition comprises an additive selected from the group consisting of curing agents, process aids, fire retardants, adhesion promoters, antioxidants, ultraviolet light stabilizers, fillers, thixotropic agents, additional silicones, dyes, and colorants.

6. The method of making the fireproof hose of claim 4, wherein the silicone rubber composition comprises a ground silica filler in an amount between from about 0-30 wt %, 1-20 wt %, 5-15 wt %, or about 10-12 wt %.

7. The method of making the fireproof hose of claim 4, wherein the silicone rubber composition comprises a fire retardant comprising a zinc borate.

8. The method of making the fireproof hose of claim 1, wherein the reinforcing layer comprises a metallic braid, optionally a stainless steel metallic braid.

* * * * *